No. 11,756. Reissued July 4, 1899.

F. L. BARTLETT.

ORE CONCENTRATING TABLE.

(Application filed June 8, 1899.)

2 Sheets—Sheet 1.

Witnesses:
L. M. Godfrey
John T. Costis

Inventor:
Frank L. Bartlett
by S. W. Bates
his Atty.

THE ECKERT LITHOGRAPHING CO., WASHINGTON, D. C.

No. 11,756. Reissued July 4, 1899.

F. L. BARTLETT.

ORE CONCENTRATING TABLE.

(Application filed June 8, 1899.)

2 Sheets—Sheet 2.

Witnesses:
L. M. Godfrey
John T. Betts

THE ECKERT LITHOGRAPHING CO., WASHINGTON, D. C.

UNITED STATES PATENT OFFICE.

FRANK L. BARTLETT, OF CANYON, COLORADO.

ORE-CONCENTRATING TABLE.

SPECIFICATION forming part of Reissued Letters Patent No. 11,756, dated July 4, 1899.

Original No. 621,515, dated March 21, 1899. Application for reissue filed June 8, 1899. Serial No. 719,854.

*To all whom it may concern:*

Be it known that I, FRANK L. BARTLETT, a citizen of the United States, residing at Canyon, in the county of Fremont and State of Colorado, have invented certain new and useful Improvements in Ore-Concentrating Tables; and I do hereby declare the following to be a full, clear, and exact description of the invention, such as will enable others skilled in the art to which it appertains to make and use the same.

My invention relates to improvements in the class of concentrators known as "shaking-tables," whereby the ore is made to pass over a surface which is subjected to a shaking or bumping motion either laterally or longitudinally. At the same time the moving ore is subjected to the action of a flow of water for the purpose of removing the rocky or more worthless particles of the material from the more valuable or heavier particles. Such devices are operated by cams or eccentrics and may have a bumping motion or a quick return motion for the purpose of throwing the material ahead. In many of the machines of this class hitherto used, as far as I am aware, the water is all applied at once to the end or along the side, and it has a tendency to pile up the ore and to wash the fine particles toward the tailings end, whereby much loss is incurred, the work at the same time being slow. Such machines in order to have much capacity need to be very large, as the ore traverses the table from one corner to the other in a comparatively narrow belt, whereby only a small portion of the table is doing work.

The object of my present invention is to construct a machine which shall be comparatively small in size, but of large capacity, doing more work on a given surface, to separate more perfectly the different minerals, saving more of the fine materials, and to make a product which will need no further separation or reconcentration.

My invention is illustrated in the accompanying drawings, in which—

Figure 1:
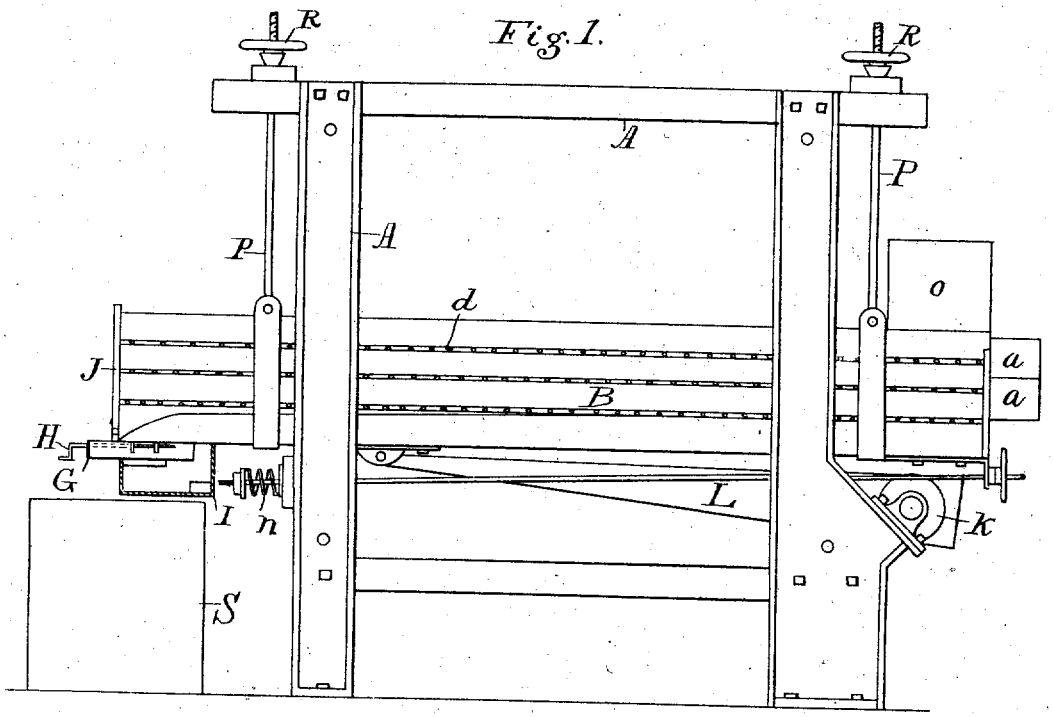
Figure 2:
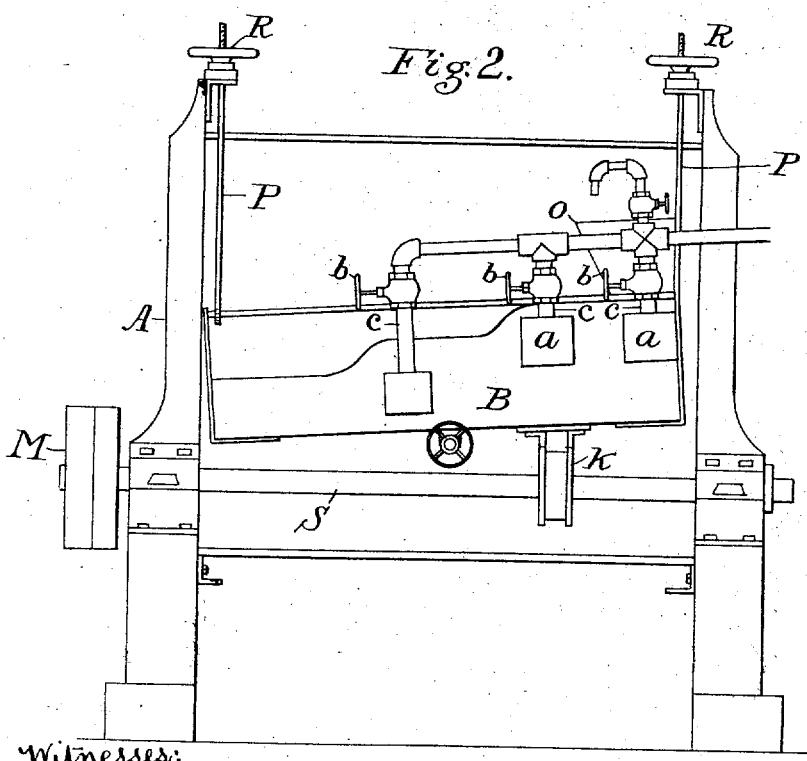
Figure 3:
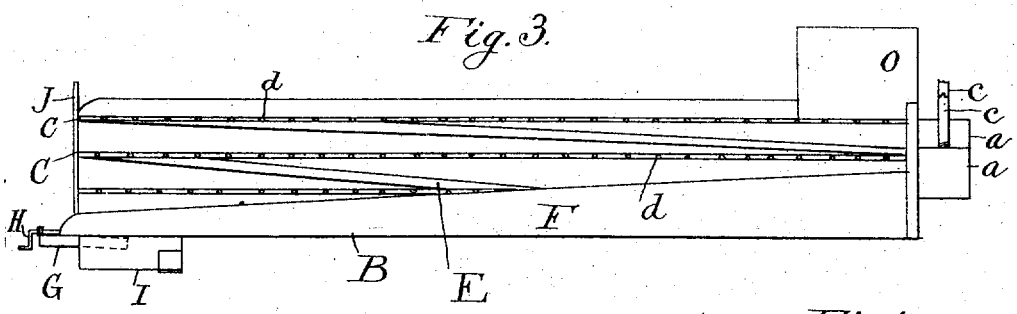
Figure 4:
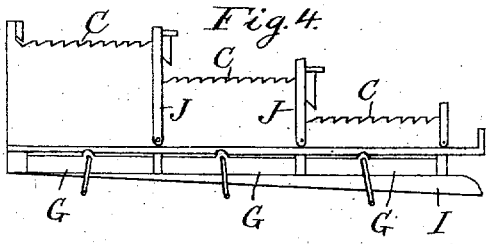
Figure 5:
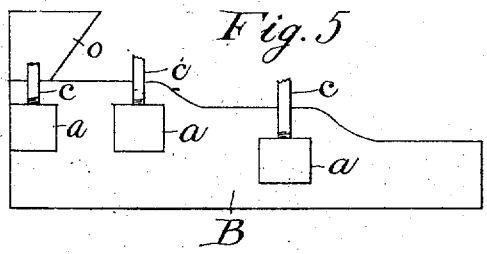
Figure 6:
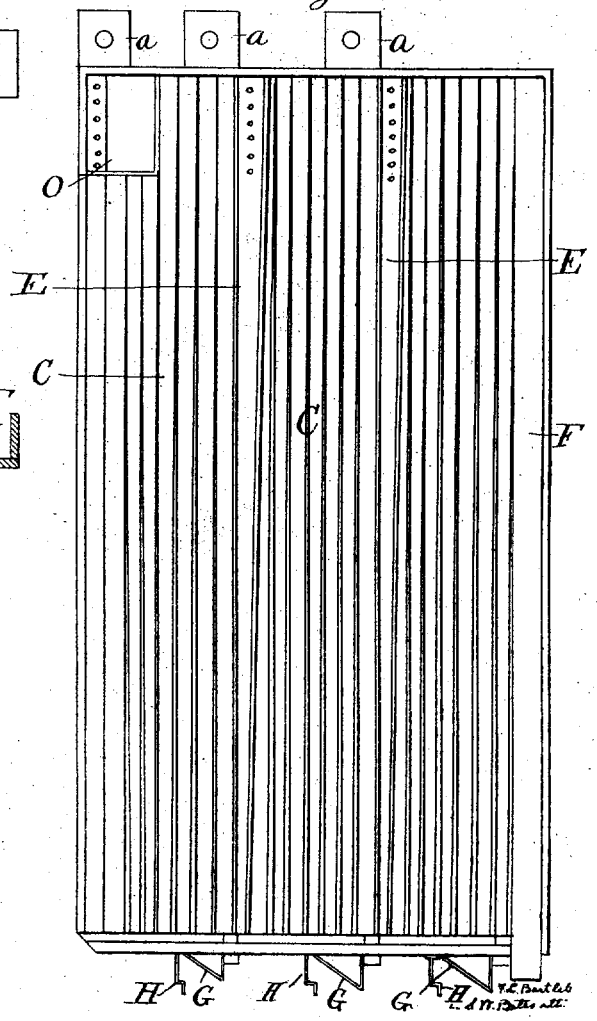
Figure 7:
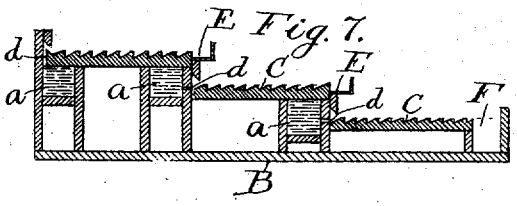

Figure 1 is a side elevation of the complete machine. Fig. 2 is an end elevation. Fig. 3 is a side view of the table. Figs. 4 and 5 are views of the two ends of the same. Fig. 6 is a plan or top view of the table, and Fig. 7 is a cross-section.

The various features of my invention reside in the table B, which is constructed with a series of shelves C—in the present case three—extending from one end of the table to the other and being placed so that the water and waste material will flow or may be mechanically conveyed from one to the other of the shelves of the series. As here shown, the shelves are arranged side by side at descending levels, and this construction I consider preferable. These shelves are considerably inclined laterally, so that the water will flow across them, and as I prefer to construct them they are substantially level from end to end. The water is admitted through pipes or boxes *a*, placed lengthwise beneath the upper shelves. Openings are provided along the upper side of each shelf connecting with the water boxes or pipes *a* for delivering water across the riffled surface of each shelf. As herein shown, I provide a series of perforations *d d*, delivering water in the form of jets, which unite and flow in a shallow sheet across the table.

The surfaces of the shelves C C are grooved or corrugated longitudinally from end to end, the grooves being in preferably the form of right-angled triangles—that is to say, one of the sides of the groove is vertical, the vertical side being that from which the flow of water comes—and the grooves extend substantially the entire length of the table, so that they terminate at its extreme end. In order to effect a complete separation of the heavier material from the lighter, I prefer to make the area of the feed ends of these grooves much greater than the discharge end, as will be seen in Figs. 4, 6, and 7, so that as the material in the grooves works down toward the discharge end of the table it tends to constantly sift to the surface the lighter particles of the material, which are carried laterally across by the flow of water. Means are provided for conveying the overflow from the side of each shelf to the beginning of the next shelf of the series.

As here shown, inclined spouts E E are provided along the lower edge of each of the two upper shelves to convey the overflow of water, waste, and unconcentrated material back to the upper end or beginning of the next lower table, and a spout F along the lower side of the last table of the series carries off the water and tailings from the machine.

O represents the feed box or hopper, through which the ore is fed to the upper end of the upper table, and *c c* are the water-pipes for supplying the boxes *a a*, each being provided with a separate valve *b*.

The concentrates are discharged into an ore-box S′, Fig. 1, or other suitable receptacle over the lower end of the table from the open ends of the grooves C C. If the grooves carry any waste rock, it is cut out and caught by the conductors G G, which are held under the end of the table by suitable guides. The inner ends of the conductors are open, and whatever material falls into them is discharged into the wasteway I and passes off with the tailings, or it may be otherwise disposed of. The position of these conductors is regulated by means of the screws H H, and they are made with diagonal ends or partitions for the purpose of cutting off or dividing the overflowing concentrates from the waste material. It will be seen that the farther out the conductors are drawn the more grooves they will cut out and that the material coming from these grooves instead of falling into the ore-boxes below will fall into the conductors and thence pass to the wasteway.

The cut-off strips J J are held against the flat end of the table and pivoted at the bottom. By swinging the upper ends of these strips a division of the different kinds of concentrators can be made—such as leads from zinc, &c.—these separated concentrates being dropped into different boxes or receptacles. A varying number of strips is used according to the number of grades of concentrates desired. There may be one at the end of each shelf, as here shown, or two or more may be used if a greater number of grades are made.

The table E is hung to the table A of the machine by means of rods P P, adjusting-nuts R R being provided for elevating and lowering the table. Motion is imparted to the table by means of a cam K on a cam-shaft S, operated by the driving-pulleys M M in the usual manner.

To operate the machine, the ore is crushed and screened to proper size, and this material mixed with water is allowed to flow in a steady stream through the feed-box O. The motion of the table shakes the heavier particles to the bottom of the triangular grooves. At the same time the ore moves ahead and is subjected to the impinging flow from the box *a*. Three forces now act on the ore—namely, one to move it ahead, one to wash it diagonally across the table, while the decreasing depth of the grooves has a tendency to elevate the ore to a higher level, whereby the lighter worthless material is brought to the surface and washed over by the flow of water.

I have discovered that a groove made in the form of a right-angled triangle or with one side vertical is more effective than any other for the saving and protection of the finely-divided ore or slimes, and I prefer this form of groove to any other.

The first shelf is so constructed that the area of the grooves at the feed end is four times as large as at the discharge end, and it is thus evident that only one-fourth of the material will be discharged over the discharge end. The next shelf below is graded one to six and the third one to eight, these having been found in my practice to give the best results, although it is evident that the graduation of the grooves should depend on the nature of the ore to be treated. Thus if the ore to be treated consists of one part valuable material and three parts rock or worthless material then one to four would be the proper graduation of the grooves.

In practice I have found that the greater part of the valuable mineral is removed by first shelf, leaving very little for the succeeding shelves to do. Any ore which escapes the first is collected and returned to the second and third, and consequently there are no "middlings" or half-concentrated material to be rerun. By returning the ore to the head of each succeeding shelf it is made to pass over a great length of shelf—as, for instance, if the table is eight feet long by returning twice or using three shelves the ore travels twenty-four feet and the eight-foot table becomes as effective as the old twenty-four-foot table of Rittenger. In practice it is found that the shelves need not be more than twelve inches wide by seven or eight feet in length, the capacity of the table of this size being greater than the old Rittenger table—twelve feet wide by twenty-four feet in length.

The sliding conductors G and the cut-off strips J J perform a valuable service by cutting out and removing any waste which flows over the end of the table and renders the machine more adjustable and automatic. This is particularly the case when working on an ore which contains two or more minerals which it is desired to save separately by means of separate shelves. Three different minerals may be saved separately one from the other, a very small difference in the gravity being sufficient to effect a complete separation.

The machine is capable of great adjustability by regulating the flow of water on each shelf, and by raising or lowering the sides or ends of the table laterally or longitudinally very fine or very coarse material may be operated on at will and the capacity regulated with great facility. If the first shelf is forced, the second or third shelf immediately takes up the surplus, and effective work is still performed. As little water is used on the first shelf it follows that less slimes or fine ore is lost, and in practice it is found that the first shelf takes up the finer ores, which is exactly the reverse of tables where all the water has to be applied at once. After the fine particles of ore are removed on the upper shelf and the material conveyed back to the beginning of the next shelf an increased flow of water may be safely used, sufficient to remove the heavy waste, as there is then no danger of washing away fine rich ore. The advantage of having the riffles extend the full length of the table consists in the fact that much better protection is given to the fine ore, which owing to the rapid vibration of the table is kept below the coarser parts and will protect them from being washed away by the water, as would be the case on a plane surface. By reason of the operation of my series of shelves and the fact that they carry the separation of the material so far as I am enabled to do away with the operation of "sizing," this work all being done by the shaking-table itself.

While I here show my table as being provided with riffles of varying depth, it is evident that any desired form of riffles may be used.

I claim—

1. The herein-described longitudinally-reciprocating shaking-table having a series of laterally-inclined shelves provided with longitudinal riffles extending to the concentrates-discharge end thereof whereby the concentrated material is discharged at the end of each shelf, a separate water-supply for each shelf and means for conveying the unconcentrated material from each shelf except the last to the next shelf in the series.

2. The herein-described longitudinally-reciprocating shaking-table having a series of laterally-inclined shelves arranged at descending levels and provided with longitudinal riffles extending to the concentrates-discharge end thereof whereby the concentrated material is discharged at the end of each shelf, a separate water-supply for each shelf and means for conveying the unconcentrated material from each shelf except the last to the beginning of the next shelf below.

3. The herein-described longitudinally-reciprocating shaking-table having a series of laterally-inclined shelves arranged at descending levels and provided with longitudinal riffles extending to the concentrates-discharge end thereof, a separate water-supply for each shelf and a spout extending along the lower side of each of the upper shelves except the last for delivering the unconcentrated material to the upper side of the next shelf below.

4. The herein-described longitudinally-reciprocating shaking-table having a series of laterally-inclined shelves arranged side by side at descending levels and provided with longitudinal riffles extending to the concentrates-discharge end thereof, a water-supply for each shelf and a spout extending along the lower side of each of the upper shelves except the last for delivering the unconcentrated material to the upper side of the next shelf below.

5. The herein-described shaking-table having longitudinal riffles adapted to discharge fine material over the end of the table and coarse material over the side and having a series of sliding conductors under the discharge end of the table, each conductor having a diagonal partition for dividing the overflowing material into sections.

6. The herein-described shaking-table having longitudinal riffles adapted to discharge fine material over the end of the table and coarse material over the side and having a series of sliding conductors under the discharge end of the table with diagonal partitions therein for cutting off waste material and cut-off strips pivoted against the end of the table for separating the concentrates into different grades.

7. In an ore-concentrator, the combination with a reciprocating shaking-table having a series of laterally-inclined shelves each provided with riffles extending in the direction of the reciprocation, an independent water-supply for each shelf adapted to deliver water across said riffles and means for conveying the unconcentrated material from the lower side of each of the upper shelves to the next lower shelf.

In testimony whereof I affix my signature in presence of two witnesses.

FRANK L. BARTLETT.

Witnesses:

CHARLES BOCKING,

F. W. BOCKING.